United States Patent [19]
Stanford

[11] Patent Number: 6,082,886
[45] Date of Patent: Jul. 4, 2000

[54] ILLUMINATION SYSTEM

[76] Inventor: Michael S. Stanford, 501 Mammoth Oaks Dr., Charlotte, N.C. 28270

[21] Appl. No.: 09/248,558

[22] Filed: Feb. 11, 1999

[51] Int. Cl.$^7$ .................................. F21S 1/02; E01F 9/00
[52] U.S. Cl. ......................................... 362/576; 362/153.1
[58] Field of Search ..................... 362/576, 581, 362/153.1, 153, 145

[56] References Cited

U.S. PATENT DOCUMENTS

| | | | |
|---|---|---|---|
| D. 376,657 | 12/1996 | Bohn .......................................... | D25/113 |
| 4,223,377 | 9/1980 | Williams .................................. | 362/145 |
| 4,303,969 | 12/1981 | Hamilton et al. ........................ | 362/153 |
| 4,340,929 | 7/1982 | Konikoff et al. ......................... | 362/153 |
| 4,394,714 | 7/1983 | Rote ......................................... | 362/576 |
| 4,532,579 | 7/1985 | Merryman ................................ | 362/239 |
| 4,570,207 | 2/1986 | Takahashi et al. ...................... | 362/153.1 |
| 4,697,950 | 10/1987 | Copeland ........................... | 362/153.1 X |
| 4,744,014 | 5/1988 | Harris ....................................... | 362/145 |
| 4,752,114 | 6/1988 | French .................................. | 362/153 X |
| 4,754,372 | 6/1988 | Harrison ............................... | 362/576 X |
| 4,907,361 | 3/1990 | Villard ................................. | 362/153.1 X |
| 4,992,914 | 2/1991 | Heiss et al. ............................ | 362/153.1 |
| 5,160,202 | 11/1992 | Legare ..................................... | 362/153.1 |
| 5,481,443 | 1/1996 | Wagner et al. .......................... | 362/153.1 |
| 5,678,920 | 10/1997 | Kerr .................................... | 362/153.1 X |
| 5,683,170 | 11/1997 | Blaha ........................................ | 362/145 |
| 5,951,144 | 9/1999 | Gavigan et al. .................. | 362/153.1 X |

*Primary Examiner*—Laura K. Tso
*Attorney, Agent, or Firm*—Kennedy Covington Lobdell & Hickman, LLP

[57] ABSTRACT

An illumination system for incorporating light into unit paved or stepping stone surfaces comprises at least one illuminated paving block which includes at least one light source and at least one optical fiber, in communication with the light source, imbedded in the paving block, and is sufficiently strong and durable. A plurality of optical fibers is preferably included within the block having first ends positioned to collect light from the light source and second ends positioned to be exposed at the top surface of the block to provide a plurality of points of light visible at the top surface. The paving block is self-contained and includes a circuit module for housing the light source and an electrical supply means for connecting the light source to an external electrical power source. The illumination system preferably comprises a plurality of illuminated paving blocks connected together and to a source of electricity to form lighted pathways, walkways, floors or large illuminated surfaces. The solid state light source may be provided in any color in the visible radiation spectrum and a timing device may be included for removing power to the illuminated blocks. The paving blocks are quickly and easily installed without specialized training.

20 Claims, 2 Drawing Sheets

ILLUMINATION SYSTEM

BACKGROUND OF THE INVENTION

The subject invention relates to concrete paving components and more particularly, relates to an illumination system comprising a paving stone or block including optical fibers and an integral solid state light source for providing surface, area, accent, edge or ornamental lighting within or outlining sidewalks, walkways, driveways, pathways and indoor or outdoor floors and walls.

Cast concrete paving components are often referred to as unit pavers when installed abutted or in quantity covering large areas and as stepping stones when installed in strings or individually to form a narrow pathway or walkway. The use of unit pavers and stepping stones for covering soil or loose surfaces to provide walkways, pathways, floors or road surfaces is well known. Typically, unit pavers and stepping stones are designed to be attractive in appearance and functional. The most common unit pavers and stepping stones are constructed from cast concrete or pressure formed aggregates to provide a heavy weight, hard surface and durable paver or stepping stone, as is needed for use in a pathway, walkway, floor or road surface. In addition to being functional, unit pavers and stepping stones are versatile and are typically available in various shapes, sizes, colors, textures and finishes and interlocking designs.

Where there is a paved surface, it is often desirable and sometimes necessary to provide lighting for the surface. The most common method of lighting a surface is to use light fixtures, such as lamp posts, designed to cast light onto the surface for aesthetic and safety reasons. However, the light cast from a fixture may only illuminate a portion of the surface immediately adjacent to the fixture and may not sufficiently light the entire surface. Moreover, it may not be practical or desirable to position light fixtures adjacent to the paved surface to provide the needed light. Thus, it is desirable to provide lighting for paved surfaces without the use of lighting fixtures.

To this end, attempts have been made to incorporate light into paved surfaces and stepping stones. Planters, curbing, steps, brick and blocks have been known to be illuminated. Examples of prior art lighting devices in paved or floor surfaces are shown in U.S. Pat. Nos. 4,992,914; 4,697,950; 4,744,014; 5,683,170; 5,678,920; 5,160,202; 4,907,361; 4,223,377; 4,340,929; and 4,303,969. In one type of illuminated stepping stone, multiple separate small light bulbs are imbedded in a groove or molded cavity in the top surface of the stone. While stones of this type have been made of concrete, one disadvantage is that the light is not spread over the entire surface of the stone. In addition, because of the precision molding required and the high maintenance requirements of the multiple light bulbs, stones constructed in this manner are typically cost prohibitive and undesirable.

Another type of illuminated stone or block is one where a light source projects light through a lens or window set in the visible surface of the stone. Bricks, blocks and curbing materials are often made by casting or molding a cavity within the object which has a window visible to the top surface in communication with the cavity and installing a light source, typically a light bulb, within the cavity that projects light through the window. While this type of product may be practical in some instances, one disadvantage is that it may require continual ongoing maintenance. Another disadvantage is that creating a cavity within the block may weaken the strength and durability of the block so that this type of block may not be ideal for surfaces used for walking or vehicle traffic or otherwise supporting heavy weights.

Similarly, stepping stones utilizing an open box with a transparent or translucent top cover with a light source placed inside the box which emits light through the cover are available. However, these types of stones do not have adequate top surface strength to resist breakage in high load or sudden impact situations. In addition, these types of stones may be subject to damage from water inclusion and may require a great deal of maintenance. Thus, all of the prior art lighting devices include chambers, grooves, channels, pockets or panels within the stone or paving object for housing a light bulb which emits light at the top surface of the stone. While some prior art devices may provide lighting for paved surfaces without the use of overhead lighting fixtures, none of the prior art devices provide a paving block or stepping stone which has the strength, versatility and functionality of a concrete unit paver or stepping stone nor do they provide a lighted surface which includes various patterns of light which may cover the entire surface of the block or stone.

Therefore, there is a need for an illuminated paving block or stone which incorporates light into the surface and has strength comparable to a concrete unit paver or stepping stone while providing an inexpensive, illuminated paving surface which is attractive in appearance, versatile, functional and may include various patterns of light, as desired, and requires little or no maintenance.

SUMMARY OF THE INVENTION

The subject invention is directed to an illumination system for incorporating light into paved or stepping stone surfaces to provide unique surface lighting while maintaining the solid construction, hard surface and durability of a concrete paving component. The illumination system include at least one illuminated paving block of stone and is designed to provide surface, area, accent, edge or ornamental lighting for use in sidewalks, walkways, driveways, pathways and indoor or outdoor floor coverings, landscaping and masonry walls, and to provide lighting for other surfaces as desired. Each paving block is self-contained and has sufficient strength and durability to carry the weight of people, vehicles or other traffic. The illumination system preferably includes a plurality of illuminated paving blocks connected together which may include specific patterns of illumination to provide lighted pathways or large lighted surfaces having a dramatic visual effect. The illuminated paving blocks may be inexpensively manufactured and are quickly and easily installed without requiring specialized training.

According to the subject invention, each illuminated paving block or stone has a top surface, a body and a bottom surface, and includes at least one light source and at least one optical fiber or fiber optic light guide, in communication with the light source, imbedded in the body of the block. In the preferred embodiment, light emitted from the light source is distributed through each paving block via a plurality of optical fibers or fiber optic light guides and is visible at the top surface of the block. Each optical fiber has first and second opposite ends and the fibers are placed within the block so that the first end is positioned to collect light emitted from the light source and the second end is positioned to be exposed at the top surface. In the preferred embodiment, the optical fibers are bundled at the first ends and affixed in such a manner as to collect light emitted from the light source and distribute it to the second ends of the optical fibers that are exposed at the top surface of the block. The second ends of the optical fibers are arrayed and terminated flush with the top surface so that a visible point of light emits from each second end to provide a plurality of lighted points visible on the surface of the block. The illumination system also includes a circuit module for housing the light source and an electrical supply means for each paving block for connecting the light source to an external electrical power source. The preferred circuit module is a voltage regulator/protection circuit designed to prevent damage to the light source and provide protection from lightning, static discharge, over-voltage conditions and incorrect installation. All optical fibers, electronic circuitry and light sources are permanently sealed and imbedded within the body of the paving block with only the electrical supply means extending outward from the block to allow interfacing with an external electrical power source.

In the preferred embodiment, the illumination system includes a plurality of paving blocks or stones connected together. Each paving block includes a plurality of optical fibers in communication with at least one light source and an electrical wire or conductor extending outward from the block that is to be interconnected to an external electrical power source. Thus, multiple paving blocks may be connected in parallel to the same electrical power source to provide a lighted pathway or large lighted surface, such as by way of example, a pathway of tiny stars, sweeping comets or sparkling patterns of light. In the preferred embodiment, the electrical wires of the paving blocks are connected together utilizing standard wiring methods. The paving blocks of the illumination system may be installed anywhere that a patterned or unit paved surface can be used. Moreover, normal indoor or outdoor temperatures, precipitation, foot or vehicular traffic, common chemicals and cleaning processes will typically have no adverse effects on the paving blocks of the subject invention.

In the preferred embodiment, each individual optical fiber or groups of optical fibers may be placed so that the second ends or points of light are positioned in a predetermined pattern to create precision surface lighting graphic designs, logos, lettering or artistic realizations in a single paving block or multiple paving blocks. For example, in a typical 12 inch square stone, more than 200 individual optical fiber second ends or points of light per light source may be placed in any conceivable pattern, such as by way of example, random "star fields" or artistic sweeps and swirls. It is a feature of the subject invention that each individual fiber end or point of light within the block can be positioned accurately within the block to create specific artistic or functional patterns. Moreover, the illumination system does not require internal chambers or grooves within the blocks to house the lights. Further, multiple paving blocks may be combined and interconnected to create large arrays or displays within a surface covered with the paving blocks.

The light source of the preferred embodiment is a solid state light source, completely contained within the paving block, which requires relatively little electricity to operate and has a long life. The preferred embodiment of the subject invention may also include an external timer or photoelectric switch for removing power to the illuminated paving blocks during times when the lighted surface is not needed or desired. By periodically removing power and turning off the lights, the long life of the light source may be further extended. The solid state light source may be provided in any color in the visible radiation spectrum, such as by way of example, bright white, blues, greens, yellow/amber/orange and red and the light color and intensity does not change significantly with age or temperature. The preferred embodiment may also include additional external circuitry to animate the light and electrically switch multiple paving blocks in varying patterns, such as by way of example, animated displays and accent entertainment applications including but not limited to dance floors, logo treatments and attention grabbers.

The preferred paving block is pre-cast from concrete or other moldable material, such as by way of example, plastics or synthetics, of the type used to create driveways, patios, walkways, borders and the like. In the preferred embodiment, the basic concrete material used in the paving blocks has a cured compressive strength comparable to other paving products and commercial surfaces. The paving block may be of virtually any shape, including interlocking, radiused or traditional squares, geometries and rectangles and the concrete can be colored in manufacturing with the addition of pigments to achieve desired architectural or artistic goals. In addition, the top surface of the paving block may be sealed with a standard transparent surface treatment with minimal dimming of the lighting effect. Further, the paving block may be molded to include surface textures and patterns, such as by way of example, simulating cobblestone, brick, fieldstone, broken granite, smooth soapstone or the like.

The installation of the illuminated paving blocks of the subject invention is similar to the installation of any other unitized surface, such as brick or stone. However, the illuminated paving blocks are installed over a compressible aggregate, such as by way of example, sand or finely crushed gravel, to allow the interconnection of the wiring which supplies electrical power to the light source. Because the wiring runs beneath the paving blocks and connects to each block, the compressible underlayment provides physical space for the wiring to be chained together. The installation process is fast, simple and does not require specialized training. In order to install the paving blocks around obstacles and within architectural confines, the illuminated paving blocks are designed to be cut, drilled and shaped with standard concrete cutting tools without significant loss of the lighting effect.

In use, the light effect realized from the illuminated paving blocks of the subject invention may be quite dramatic in low ambient light conditions. When installed in a typical outdoor area, such as an area lit by parking lot lamps or architectural accent lighting, the illuminated paving blocks provide a bright and noticeable effect. In indoor areas lit by standard incandescent, gas tube or specialty lighting, the effect is equally noticeable, dramatic yet subtle. Though not intended to be visible in direct sunlight, the illuminated paving blocks may provide a glimmer or sparkle effect in an illuminated outdoor surface exposed to direct sun. If desired, power to the illuminated paving blocks may be removed using a timer or photoelectric switch during bright days when this daytime effect is not required or desired. By operating the illuminated paving blocks only during evenings and overcast days, the finctional life span of the light source may be substantially increased. When not lit, the illuminated paving block of the subject invention is indistinguishable from any other concrete based paving product.

Therefore, it is an object and feature of the subject invention to provide an illumination system for incorporating light into paved or stepping stone surfaces to provide unique surface lighting while maintaining the solid construction, hard surface and durability of a concrete paving component.

It is also an object and feature of the subject invention to provide an illumination system with at least one illuminated paving block or stone which includes at least one optical fiber, an electrical supply means, and a light source in communication with the optical fiber imbedded in the paving block for providing a point of light visible at the top surface of the block.

It is also an object and feature of the subject invention to provide an illumination system with a paving block or stone which includes a plurality of optical fibers, an electronic protection circuit and a solid state light source for defining a plurality of lighted points visible at the top surface of the block for providing surface area, accent, edge or ornamental lighting within or outlining walkways, driveways, pathways and indoor or outdoor floors and walls.

It is a further object and feature of the subject invention to provide an illumination system which includes a plurality of illuminated paving blocks having predetermined patterns of light visible at the top surface and being connected together to provide pathways or large lighted surfaces having a dramatic visual effect.

Further details, features and advantages of the invention can be understood from the exemplary embodiments described in the following description with reference to the accompanying drawings.

DETAILED DESCRIPTION OF THE PREFERRED EMBODIMENT

Figure 1:
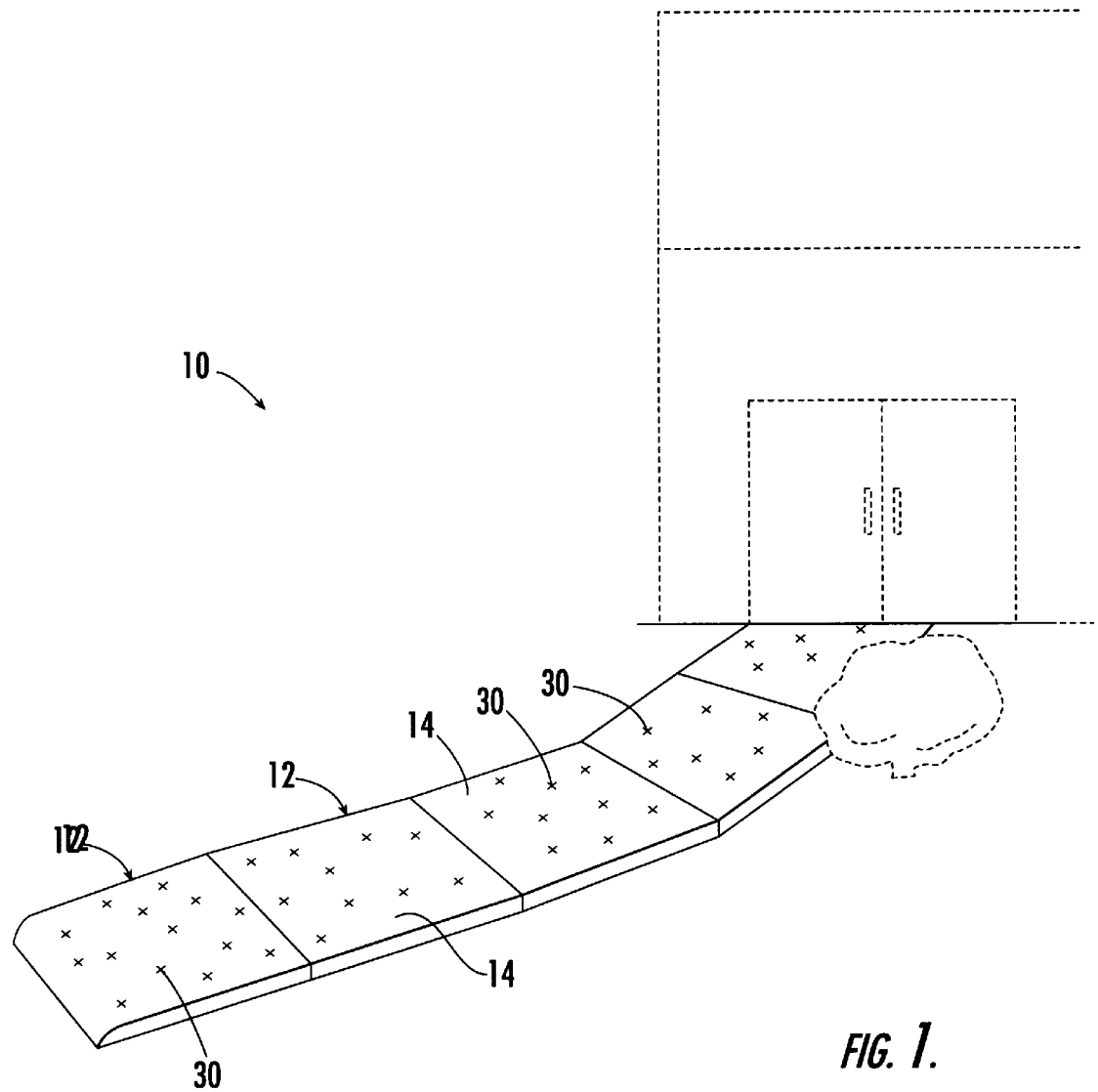
FIG. 1 is a perspective view of the illumination system forming a walkway and illustrating random patterns of light in the walkway.
Figure 2:
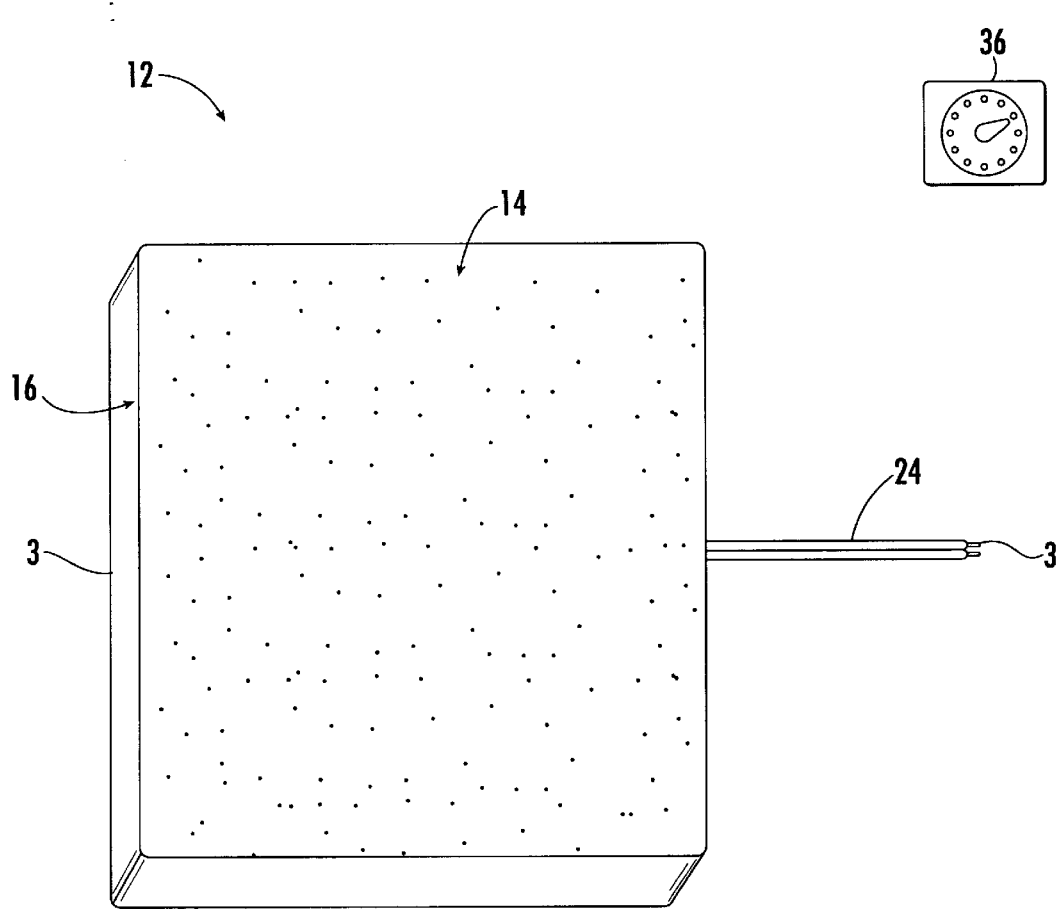
FIG. 2 is a top perspective view of a paving block and showing the timing device for removing power to the light source.
Figure 3:
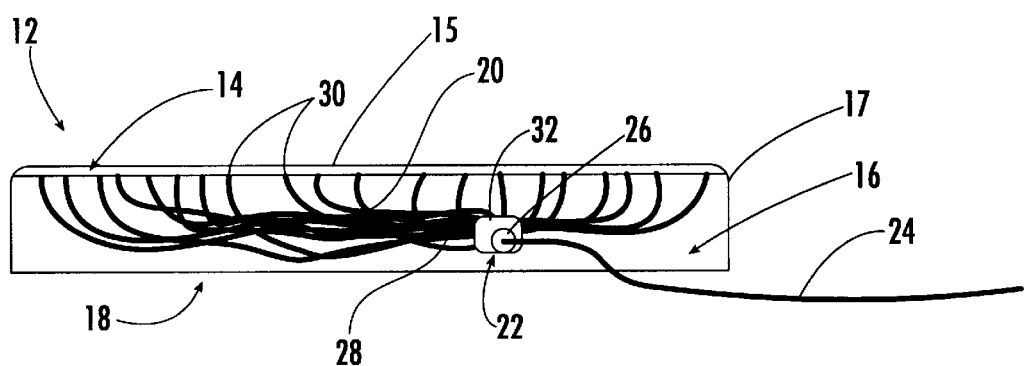
FIG. 3 is a cross-sectional view taken along line 3—3 of FIG. 2 showing the optical fibers and light source imbedded in the paving block.

Referring now to the attached drawings and initially to FIGS. 1–3, the illumination system of the subject invention is designated generally by the reference numeral 10 and comprises at least one paving block 12 having a top surface 14, a body 16 and a bottom surface 18. Each paving block 12 includes at least one fiber optic light guide or optical fiber 20 and at least one light source 22 permanently sealed and embedded within the body 16 of the paving block 12. The paving block 12 also includes an electrical supply means, such as suitable electrical wiring 24 extending outward from the block 12 for connecting the light source 22 to an external electrical power source. The light source 22 is housed within a safety circuit module 26 which is designed to prevent damage to the light source 22. The preferred circuit module 26 is an epoxy-dipped voltage regulator/electronic protection circuit module which preferably protects from lightning, static discharge, over voltage conditions and incorrect installation.

In the preferred embodiment, each paving block 12 includes a plurality of fiber optic light guides or optical fibers 20 to provide a plurality of lighted points visible on the top surface 14 of the block 12. Each optical fiber 20 has a first end 28 and a second end 30 opposite from the first end 28. The first end 28 is positioned to collect light emitted from the light source 22 and the second end 30 is positioned to be exposed at the top surface 14 to define a point of light. As shown in FIG. 3, the optical fibers 12 are bundled at the first ends 28 and include a retaining member or ring 32 adapted to receive and retain the bundled first ends 28. The member 32 and optical fiber first ends 28 therein are positioned to collect light emitted from the light source 22 which is connected to an external electrical power source via the electrical wiring 24. The light is distributed to the second ends 30 which are arrayed and terminated flush with the top surface 14. In the preferred embodiment, optical fibers 20 are placed within the block 12 so that the second ends 30 may be arranged in a predetermined pattern, such as, by way of example, graphic designs, logos, lettering, artistic realizations or the like, to create sparkling patterns of light at the top surface 14.

As illustrated in FIG. 1, the illumination system of the preferred embodiment includes a plurality of paving blocks 12 connected together to form a walkway, or lighting for other surfaces as desired. The paving blocks 12 are designed to be interconnected and may be connected in parallel to the same external power source. The preferred paving block 12 is precast from concrete or other moldable material and may be of virtually of any shape, including interlocking, radius or traditional squares, geometrics and rectangles. In the preferred embodiment, the paving block 12 has a substantially square shape and includes rounded corners 17 to prevent chipping. The concrete can be colored in manufacturing with the addition of pigments to achieve desired architectural or artistic goals. In addition, the top surface 14 of the paving block 12 may be sealed with a standard transparent surface treatment to form a transparent layer 15 with minimal dimming of the lighting effect. Further, the paving block 12 may be molded to include surface textures and patterns, such as, by way of example, simulating cobblestone, brick, fieldstone, broken granite, smooth soapstone or the like.

In the preferred embodiment, the electrical wires 24 of the paving blocks 12 are connected together using standard wiring practices. Multiple paving blocks 12 can be combined and interconnected to create large arrays or displays within a surface. It is a feature of the subject invention that the flexible nature of the fiber optic bundle allows each individual optical fiber 20 or groups of optical fibers 20 to be placed so that the second ends 30 are positioned in a predetermined pattern, such as, by way of example, random "star fields" or artistic sweeps and swirls, to create a lighted pathway or large lighted surface with sparkling patterns of light. The optical fibers 20 may be accurately positioned utilizing a computer-controlled assembly or any other suitable means. The preferred embodiment may also include additional external circuitry for animating the light patterns and electrically switching multiple paving blocks 12 in varying patterns.

The light source 22 of the preferred embodiment is a solid state light source which requires very little electricity to operate and has a long life. The solid state light source may be any color in the visible radiation spectrum, such as, by way of example, bright white, blues, greens, yellow/amber/orange and red. The standard colors may be closely matched to minimize paving block light color variation and light color and intensity does not change significantly with age or temperature. Further, the illumination system of the subject invention may include multiple colors in a single paving block. In addition, the preferred embodiment of the subject invention may include a timing device 36 or photoelectric switch for activating and removing power to the illuminated paving blocks 12 as desired. Though not intended to be visible in direct sunlight, the illumination system provides a glimmer or sparkle effect in an outdoor surface exposed to direct sun. The timing device 36 may be used to remove power from the illuminated surface during bright days when this daytime effect is not required or desired, thereby extending the already long life of the solid state light source 22. Thus, the subject invention may include multicolor light sources and electrically controlled switching, animated displays and accents, entertainment applications, such as, by way of example, dance floors, logo treatments, and attention grabbers.

The illumination system of the preferred embodiment is installed similar to the installation of any other unitized surface, such as stone or brick. However, in order to allow for the interconnection of the electrical wiring 24, the paving blocks 12 are installed over a compressible aggregate, such as, by way of example, sand or finely crushed gravel. When installed and in use, the illumination system provides a noticeable lighting effect and may include predetermined, specific patterns of light. When not in use, the paving blocks 12 of the illumination system are distinguishable from any other concrete based paving products. The basic concrete material used in the paving blocks 12 has a cured compressive strength of approximately 5,000 PSI making the paving blocks of the subject invention comparable in strength characteristics to other unitized paving products and commercial surfaces. Pigments may be added to the cement to create colored concrete, as desired. In addition, the paving block surface may be sealed with standard transparent surface treatments with minimal dimming of the lighting effect. Further, the paving blocks 12 may include surface textures and patterns formed in the concrete, such as by way of example, simulating cobblestone, brick, fieldstone, broken granite or smooth soapstone. The paving block 12 may be cut, drilled and further shaped with standard concrete tools for installation around obstacles and within architectural confines without significant loss of the illuminated effect.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An illumination system comprising:
   a. at least one paving block having a body and a top surface;
   b. a light source and at least one optical fiber embedded in the body of said block, said light source for emitting light and said optical fiber in communication with said light source;
   c. an electrical supply means for placing said light source in communication with an electrical power source; and
   d. wherein light from said light source is visible from said top surface for providing surface lighting.

2. The illumination system of claim 1, wherein said paving block further includes a circuit module imbedded in the body for housing said light source.

3. The illumination system of claim 1, wherein said optical fiber has first and second opposite ends, said first end being positioned to collect light emitted from said light source.

4. The illumination system of claim 3, wherein said second end is positioned to be exposed at said top surface whereby light collected at said first end is distributed to said second end and visible at said top surface.

5. The illumination system of claim 4, wherein said second end defines a visible point of light.

6. The illumination system of claim 4, wherein said electrical supply means comprises an electrical wire connected to said light source and extending outward from said block.

7. The illumination system of claim 1, wherein said paving block is concrete material.

8. The illumination system of claim 1, wherein said paving block includes a plurality of said optical fibers imbedded within said body.

9. The illumination system of claim 8, wherein each optical fiber includes first and second opposite ends, said first ends of said fibers being bundled and affixed together.

10. The illumination system of claim 9, wherein each second end is positioned to be exposed at said top surface whereby light collected at said first end is distributed to said second end and visible at said top surface.

11. The illumination system of claim 10, wherein each second end defines a visible point of light.

12. The illumination system of claim 10, wherein said second ends are arranged in a predetermined pattern for providing patterns of light visible at said top surface.

13. The illumination system of claim 10, wherein said paving block further includes a retaining member adapted to receive and retain said bundled first ends of said optical fibers, said member and optical fiber first ends therein being positioned to collect light emitted from said light source.

14. The illumination system of claim 1, wherein said paving block further includes a circuit module for housing said light source.

15. The illumination system of claim 14, wherein said circuit module is epoxy dipped and said light source is adapted to be mounted therein for preventing damage to said light source.

16. The illumination system of claim 1, wherein said illumination system further comprises a plurality of paving blocks adapted to be connected together and to an electrical power source for providing surface lighting for a large surface.

17. The illumination system of claim 16, wherein said connected paving blocks form a pattern of lights.

18. The illumination system of claim 1, wherein said top surface includes a transparent layer.

19. The illumination system of claim 1, wherein said paving block further includes external electrical circuitry for animating the light provided by said light source.

20. An illumination system comprising:
   a. at least one concrete paving block having a body, a top surface and a bottom surface;
   b. a light source and at least one optical fiber embedded within the body of said block, said light source for emitting light and said optical fiber in communication with said light source;
   c. a circuit module for housing said light source and an electrical supply means comprising an electrical wire connected to said light source and extending outward from the bottom surface of said block for placing said light source in communication with an electrical power source; and
   d. wherein said optical fiber has first and second opposite ends, said first end being positioned to collected light emitted from said light source and said second end being positioned to be exposed at said top surface whereby light collected at said first end is distributed to said second end and visible at said top surface for providing surface lighting.

* * * * *